April 6, 1971     YUTAKA YOSHIKAWA     3,574,109

HEAT INSULATING LAMINATE

Filed March 27, 1968     4 Sheets-Sheet 1

INVENTOR.
Yutaka Yoshikawa
BY
Wenderoth, Lind & Ponack
Attorneys

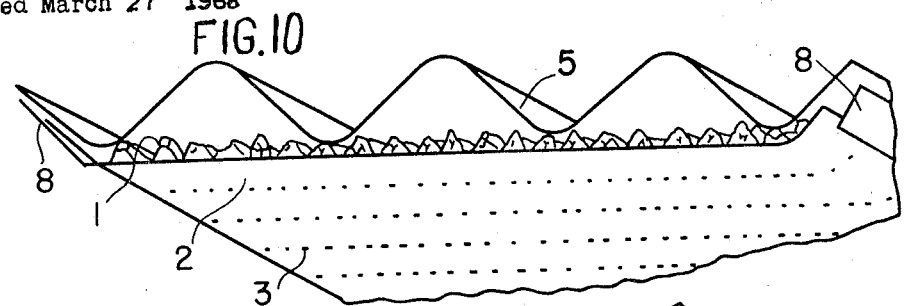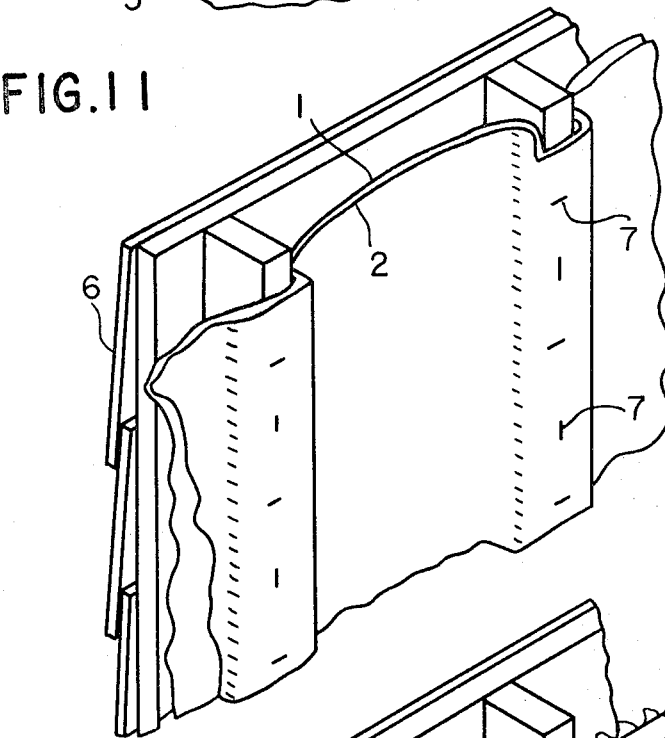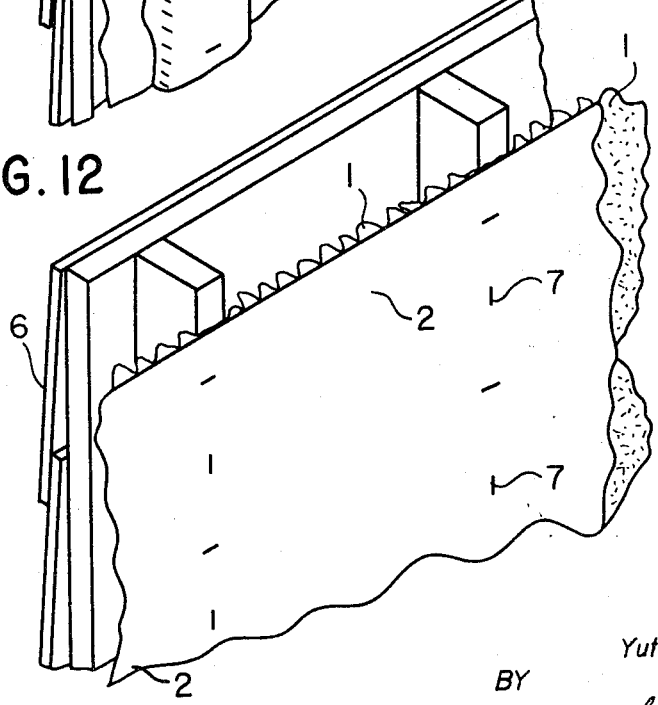

United States Patent Office 3,574,109
Patented Apr. 6, 1971

3,574,109
HEAT INSULATING LAMINATE
Yutaka Yoshikawa, 2–24 Hatsudai, Shibuya-ku,
Tokyo, Japan
Filed Mar. 27, 1968, Ser. No. 716,471
Claims priority, application Japan, May 9, 1967,
42/28,895
Int. Cl. B32b 3/28
U.S. Cl. 161—128                           3 Claims

ABSTRACT OF THE DISCLOSURE

This invention is to provide a heat insulating material convenient in handling, consisting of an aluminum foil and a thermo-contractile plastics film bonded with each other at scattered points all over the surface of the film in advance as a composite sheet and method of forming a heat insulating layer, which is very easy in working, on an object to be heat-insulated, wherein the composite sheet is fixed to the object and heated to produce wrinkles by the shrinkage of the film and air spaces between the aluminum foil and plastics film.

BACKGROUND OF THE INVENTION

Field of the invention

The present invention relates to a heat insulating material and a method of forming a heat insulating layer on any object to be heat insulated by fixing the said heat insulated material to the said object.

Description of the prior art

Heretofore, the utilization of an aluminum foil as a heat insulating material was well known. Further, it was also known to elevate the heat insulating effect by wrinkling the aluminum foil.

All of these conventional methods were based on the idea of combining a high reflecting property of radiant heat at the surface of the aluminum foil with an air layer having a proper thickness, and an excellent preformance could be obtained by these methods. At the same time, however, these methods of utilizing an aluminum foil as the heat insulating layer had various disadvantages. For instance, a method called a plane method, in which aluminum foils of 0.013 to 0.020 mm. thickness are parallelly stretched to form several air layers, is attended by disadvantages that the working is very complicated and the working cost and material cost become high, though the method itself is an excellent heat insulating method.

Secondly, a so-called wrinkling method, in which several aluminum foils of 0.007 to 0.009 mm. thick are wrinkled in advance and then placed on each other with a distance of about 10 mm. between each layer for the purpose of causing a better effect of radiation by eliminating convection by numberless air chambers, though there remains still some heat conducting action, is used more extensively, particularly for use in refrigerators, cars and the like, then the plane method because of lower working costs, but has a disadvantage in that a special skill is required for the wrinkling work.

Thirdly, there is further applied a so-called corrugating method, in which several hard aluminum foils of 0.05 to 0.1 mm. are placed on each other as corrugated and are bound together, while placing such non-conductors as bamboos or ribbons between corrugated foils at a proper distance to prevent a metallic contact. Also this method has disadvantages that material costs will be high on account of thick foils being used and the working is complicated.

Further, is either method it will be necessary to paint the surfaces of aluminum foils with a transparent laquer in case the aluminum foils come into contact with water containing an acid, alkali or salt.

As is seen from the above mentioned, any conventional heat insulating method which utilizes aluminum foils seems to be attended with disadvantages that a trouble and skill are required in working and costs become high, and this makes the application of conventional methods all the more difficult in view of an increasing shortage of labour powers in the recent time. The present invention is to overcome these disadvantages and provide unprecedented advantages.

SUMMARY OF THE INVENTION

In this disclosure the term "heat insulating material" designates a composite sheet consisting of an aluminum foil and a thermo-contractile plastics film partly bonded with each other in advance so that the bonding points may distribute so uniformly as possible all over the surface of the sheet. The partial bonding of an aluminum and plastics film is practically that the aluminum foil and the plastics film are bonded at many scattered points or lines. The term "heat insulating layer" designates a composite sheet fixed to any object to be heat-insulated with a shrinkage allowance in length and subjected to heating, whereby the aluminum foil is wrinkled, while the plastics film is tightened and air spaces are formed thereby between the aluminum foil and the plastics film. The object of the present invention is to provide a heat insulating material layer which has a very small thermal conductivity and very light in weight.

Another object of the present invention is to provide a heat insulating material which is very convenient in handling.

A further object of the present invention is to provide a prefabricated article composed of the composite sheet and any other material such as, for instance, corrugated plate as an assembly member.

A still another object of the present invention is to provide a method for forming a heat insulating layer on an object to be heat-insulated which is very easy in working and of low cost.

In the present invention, the bonding may be made either by a method using an ordinary binding agent or any other method such as fusion. As the purpose of doing so is to wrinkle the aluminum foil by a contraction of the plastics film while the aluminium being restrained at the bonding points, the distribution of the bonding points are preferable to be favorable to the wrinkling. As shown later in the drawings, in case aluminium foils are to be pasted to each of the front and back surfaces of a film, the bonding points on the both surfaces may coincide with each other, but in case films are to be pasted to each of the front and back surfaces of an aluminium foil the bonding points on the both surfaces should be deviated from each other.

In general, by pasting a plastics film to an aluminum foil there can be enumerated such many advantages that:

(1) The plastics film serves to wrinkle the aluminium foil;
(2) The plastics film serves to hold the aluminium foil;
(3) The plastics film prevents the break of the aluminium foil;
(4) The plastics film prevents the deformation of the wrinkles of the aluminium foil;
(5) The plastics film prevents the wrinkles of the aluminium foil from thrusting into the next layer;
(6) The plastics film makes it possible to paste the aluminium foil layers on each other;

(7) The plastics film prevents the contact of the aluminium foils with each other;
(8) The plastics film insulates electricity in the case of an accidental leakage of electricity;
(9) The plastics film prevents the deposition of dust and the corrosion of the aluminium foil to be caused thereby (such as on the back of a ceiling) and imparts resistances to acids, alkalis and salts;
(10) The heat conduction due to the contact of the aluminium foil layers with each other is made so low that dewing can also be prevented;
(11) The heat insulating effect of the boundary layer air on the plastics film surface can be added;
(12) The fitting work can easily be performed without touching the aluminium foil, when fixing the composite sheet to any object on the plastics film surface, and also the heat conduction is reduced;
(13) It is possible to fix the composite sheet to a curved surface or irregular surface of a duct and to wind it round a duct or the like, and also an outer surface treatment can simultaneously be performed thereby;
(14) The heat insulating material of the present invention can freely be transported in the form of a composite sheet to any place, where the composite sheet is used for fixing it to any object to be heat-insulated, without previously fixing it to the object and making wrinkles on the sheet. However, it is also possible to make a prefabricated article as an assembly member by combining, for instance, the composite sheet and corrugated plate.

The composite sheet to be used in the present invention can be supplied in the form of a long belt-formed roll. As the sporadical bonding of the aluminium foil and plastics film can be made by means of a printing application of an adhesive or a high frequency fusion the mass production of the composite sheet is possible and it is very convenient in handling on account of its small volume.

BRIEF DESCRIPTION OF THE DRAWINGS

FIGS. 9 and 10 show an example of combining a composite sheet with a corrugated plate. FIGS. 11, 12, 13 and 14 show an example of the case of applying the composite sheet as an intermediate layer of a wall.

DESCRIPTION OF THE PREFERRED EMBODIMENT

The present invention will be explained in reference with the attached drawings.

Figure 1:
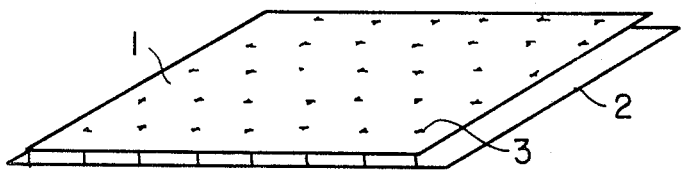
FIG. 1 shows one of the simplest examples of a composite sheet and FIG. 2 shows the composite sheet in FIG. 1 as wrinkled by heating, that is, a heat insulating layer.

FIG. 1 shows one of the simplest examples of a composite sheet to be used in the present invention. In the drawing, 1 is an aluminium foil, 2 is a contractile plastics film and 3 is bonding points (also hereinafter).

Figure 2:
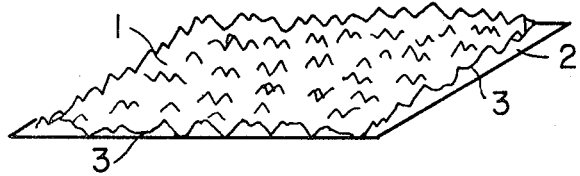

FIG. 2 shows the composite sheet in FIG. 1 as wrinkled due to shrinkage of the film by heating, that is, a heat insulating layer. In applying the composite sheet to any object to be heat-insulated it is necessary that the composite sheet should be properly fixed on the periphery with any of rivets, nails, binders, adhesive tapes and fine bars.

Figure 7:
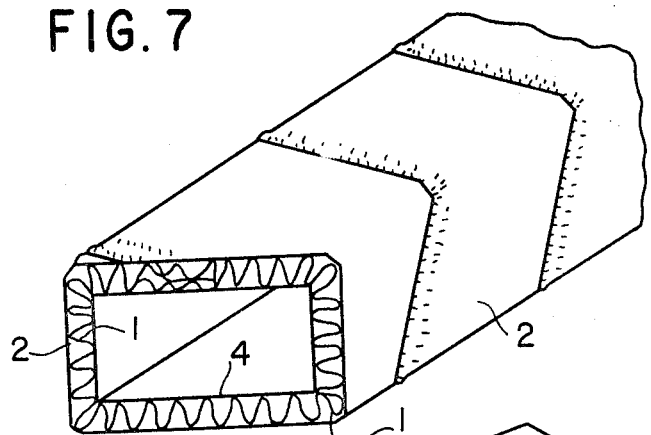
FIGS. 7 and 8 show one of the examples in the case of applying a heat insulating layer to a duct having a square section.

Also it may be fixed in such manners as shown in FIG. 7 and successive figures.

Figure 3:
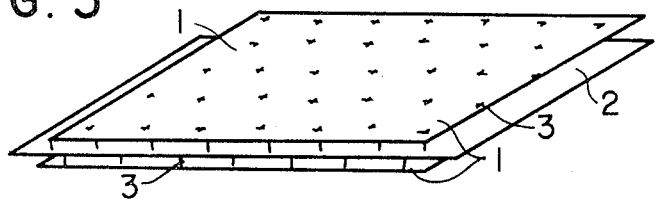
FIGS. 3, 4, 5 and 6 show another example of a composite sheet.
Figure 4:
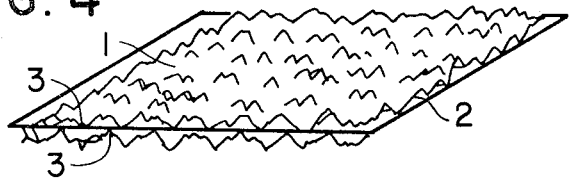

FIGS. 3 and 4 show another example of a composite sheet wherein aluminium foils are placed on each of the front and back surfaces of an contractile plastics film.

Figure 5:
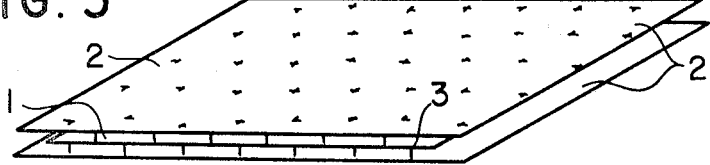
Figure 6:
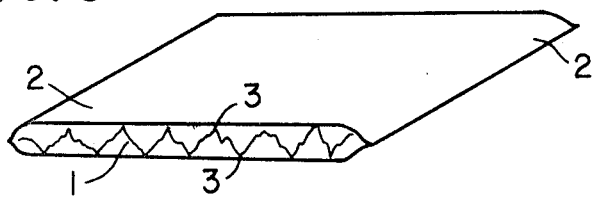

FIGS. 5 and 6 show an example wherein plastics films are placed on each of the front and back surfaces of an aluminium foil.

The example in FIGS. 3 and 4 has a feature that both material cost and working cost are economical in respect that two aluminium foils can be wrinkled with one plastics film.

In the example in FIGS. 5 and 6, there are features that, as tight plastics films will be produced on each of the front and back surfaces of an aluminium foil by the shrinkage the contact between aluminium foils will be prevented, when placing several aluminium foils on each other, whereby the heat conduction can be eliminated and wrinkles of one layer will not thrust into other layers, there is required no special fixing method of the layers, which means a great advantage in working. In this case it is self-evident that the fact of the air layer being more completely partitioned into numberless air chambers contributes the more advantageously to the heat insulation. This is effective also to prevent the contact with dust, dew or steam containing an acid, alkali or salt.

Figure 8:
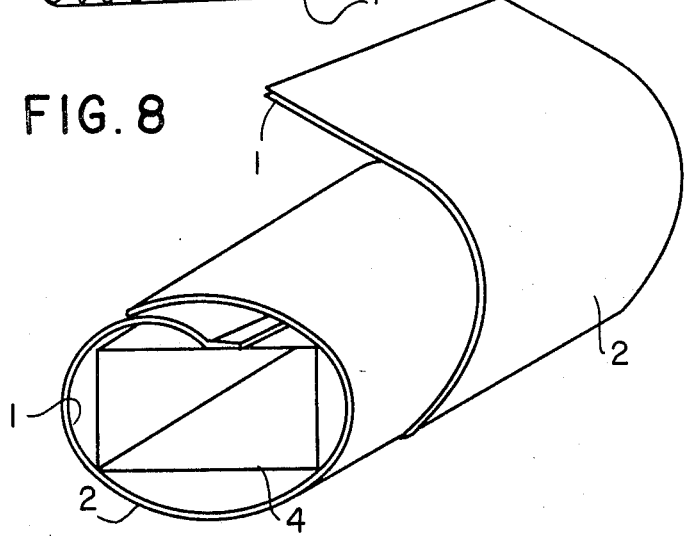

FIG. 7 shows one of the embodiments in the case of applying a heat insulating layer to a duct such as for an air conditioning apparatus, wherein 4 is a cross section of the duct. FIG. 8 is a partly sectioned sketch showing the state in a preparatory stage to be brought to that shown in FIG. 7. That is, FIG. 7 shows a partly sectioned view of the stage, wherein the composite sheet as loosely and spirally wound round the duct as in FIG. 8 is shrunk and wrinkled by being heated with hot air or radiant rays. If the width of the conductile plastics film is made somewhat larger than that of the aluminium foil, there can be obtained an effect that the overlapped ear parts form a shape favorable to the heat insulation.

Though FIG. 7 shows one winding of the heat insulating layer, it is also possible to repeatedly pile up any number of windings thereon to make multi-layers or to wind the composite sheets around the duct several times, as is shown in FIG. 8, and then feed a hot air into the composite sheets in piles in a heating vessel so that the sheets may be shrunk and wrinkled at a stroke.

In the method of the present invention it is also possible to utilize the heat insulating layer of the present invention in combination with any other conventional heat insulating material, for instance, glass wool in sandwich form or making the layer of the present invention as an outer fitting member. In the latter case, glass wool is fitted to the duct and then the composite sheet of the present invention is applied thereon. It is one of the features of the present invention that the composite sheets of the present invention can easily be applied to curved parts or jointing parts of the duct, though not illustrated.

Figure 9:
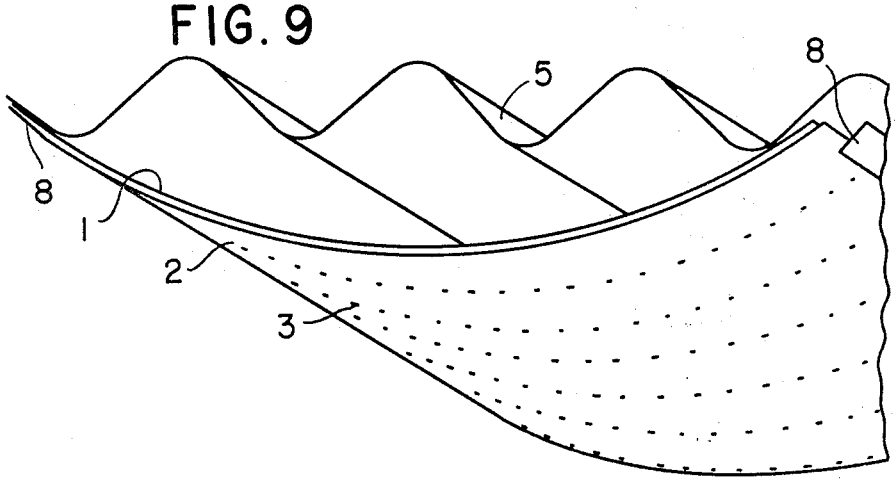
Figure 13:
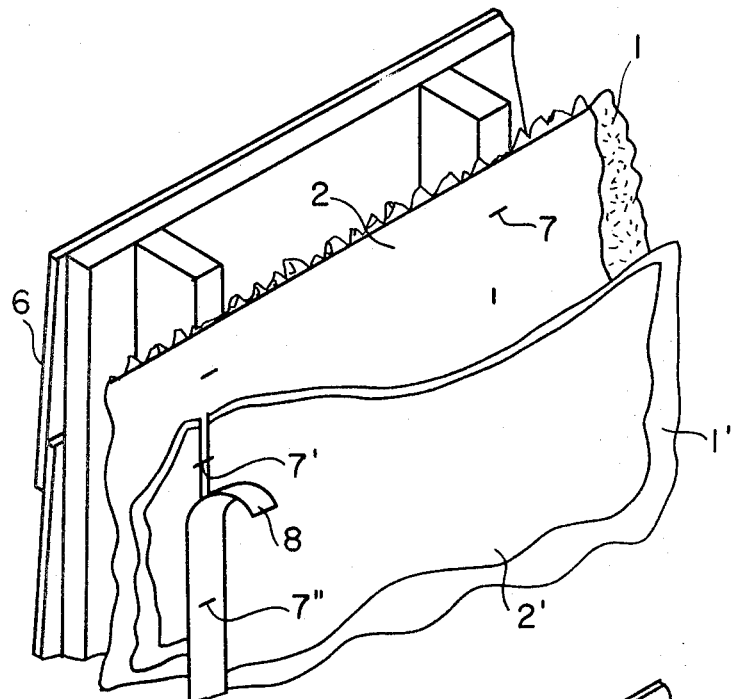

FIGS. 9 and 10 shows an example of combining the composite sheet with a corrugated plate. In the drawings, 5 is a corrugated plate and 8 is an adhesive tape. The adhesive tape may be replaced with any other means such as, for instance, direct bonding. In the example shown in FIGS. 9 and 10, the aluminium foil is inside, but is not limited thereto. It may be outside as required. It is, of course, also possible to apply the composite sheets in multi-layers. By combining one or two layers of the composite sheets with the corrugated sheet the coefficient of overall heat transmission can be reduced to be about ½ to ¼ of that of the corrugated sheet plate only, because the concaves of the corrugated plate form new spaces by the shrinkage of the contractile film (in addition to the action as of the heat insulating material of the present invention) and the heat insulating effect of the air layer can be added.

This has an advantage that, as composite sheets of the present invention can be fixed to corrugated plates in the peripheral parts in advance, but fixed loosely so as to be in the same form as of the corrugation (that is, to leave a space for tightening by shrinkage), any number of the composite sheets can be transported as corrugated plates in close touch with each other. It is one of the greatest advantages of the present invention that the composite sheets of the present invention can be made a prefabricated material as above mentioned.

Figure 14:
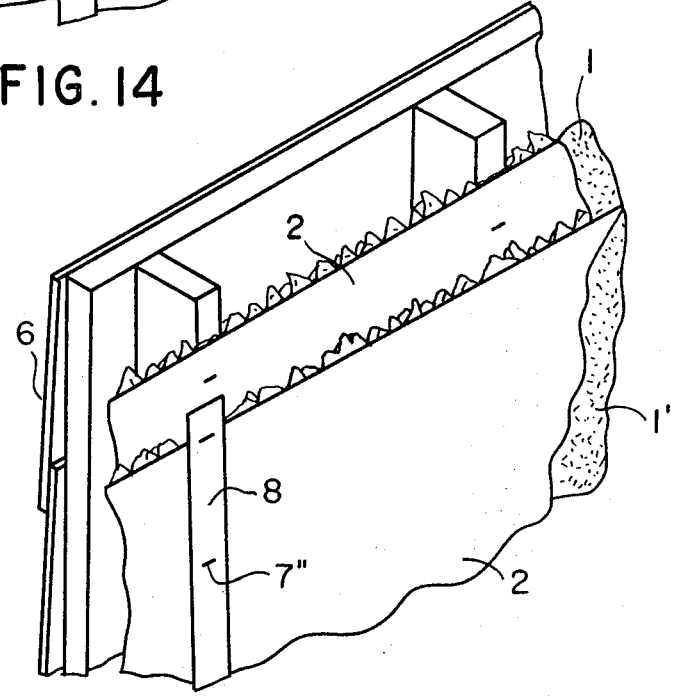

FIG. 11 and the others following it show an example of the case of applying the composite sheet of the present invention as an intermediate layer of a wall. 6 is a panel on the outer surface, 7 is a stitching metal piece (which may be a rivet or nail) and 8 is a tape. 7' and 7" are stitching metal pieces secondly and thirdly struck-in from above respectively. In this case, too, the aluminium foil may be faced outwards. Further, any proper spacer may be inserted between the first layer and the second layer. But, in the present invention such a spacer can be dispensed with, because without it aluminium foils may be separated from each other as above mentioned. After the application of the heat insulating layers of the present invention has been finished as shown in FIG. 14, any desired inner fitting member is to be fitted thereon. The composite sheets can be applied also to a ceiling and floor in the same manner as to the wall and is effective to prevent water and moisture. As it prevents also the passage of steam, it is very suitable for preventing dewing.

Further, as it can intercept hot air, smoke and flame and reflect radiant heat, it can have a function of checking the spreading out of fire in the first half period of a fire outbreak. The fire-proof property of the heat insulating layer of the present invention may be further improved by using it in combination with mineral fibres or the like.

The results of the experiments made on the heat insulating layers of the present invention were as follows:

A composite sheet having the width of 90 cm. in a non-contracted state consisting of an aluminium foil of about 7 microns thick and polyvinyl chloride film having about 20 microns thick bonded with each other at circular spots, each of which has a diameter of about 3 mm. and spaced from each other in a distances of 2 cm. lengthwise and breadthwise respectively was wound round a duct having a square section, wherein the composite layer was cut from a long roll with an allowance of about 40% in length under the expectation that the composite layer would be shrunk by 40% lengthwise and breadthwise by heating and loosely wound round the duct in a ring-shaped form, while the both edges of the composite sheet being closed by a bonding tape. When the composite sheet was heated, it was shrunk by 40% and tightly fixed to the duct. In the layer fixed to the duct the polyvinyl chloride film was faced outwards.

The experiments were made about the cases, wherein the layer was fixed to the duct in a single winding and double and threefold windings.

The average thickness of layer wrinkled by heating was as follows:

TABLE 1

[Average thickness of layers after being wrinkled]

| | Plain part, m/m | Corner part, m/m |
|---|---|---|
| Single layer | 3.9 | |
| Double layers | 7.8 | 3.0 |
| Threefold layers | 11.2 | 4.5 |

The experiments were carried out in an air-conditioned laboratory under the following conditions:

TABLE 2

| | Single layer | | Double layers | | Threefold layers | |
|---|---|---|---|---|---|---|
| Test specimen No. | No. 1 | No. 2 | No. 1 | No. 2 | No. 1 | No. 2 |
| Relative humidity in room, percent | 72 | 70 | 75 | 73 | 75 | 75 |
| Temperature in room, °C | 30.0 | 29.9 | 30.4 | 30.0 | 30.3 | 30.2 |
| Temperature in duct, °C | 15.5 | 11.1 | 16.0 | 11.0 | 15.5 | 11.0 |

| | a | b | c | a | b | c | a | b | c | a | b | c | a | b | c | a | b | c |
|---|---|---|---|---|---|---|---|---|---|---|---|---|---|---|---|---|---|---|
| Layer surface temperature, °C | 25.2 | 25.2 | 25.0 | 23.5 | 23.5 | 23.5 | 26.5 | 26.5 | 26.5 | 25.1 | 25.6 | 25.3 | 27.0 | 27.0 | 27.2 | 26.0 | 26.0 | 26.1 |
| Duct surface temperature, °C | 20.4 | 21.4 | 21.6 | 16.3 | 17.5 | 18.0 | 20.0 | 20.8 | 21.0 | 14.8 | 15.8 | 16.1 | 18.5 | 19.0 | 19.0 | 14.2 | 15.2 | 15.2 |

In the above table a, b and c designate the positions, at which the temperatures have been measured, wherein b is a middle point (side surface) of the duct having an overall length of 1,800 mm. and a and c the points at a distance of 600 mm. right and left from b respectively.

The values of thermal conductivity ($\lambda$) calculated by these experiments were 0.031 to 0.042 Kcal./m. hr. °C. as shown in the Table 3.

TABLE 3

[Calculated values of $\lambda$]

| | No. 1 (temperature in duct=15°C.) | | | | No. 2 (temperature in duct=10°C.) | | | |
|---|---|---|---|---|---|---|---|---|
| | a | b | c | Average | a | b | c | Average |
| Single layer | 0.034 | 0.042 | 0.049 | 0.042 | 0.030 | 0.030 | 0.040 | 0.035 |
| Double layers | 0.039 | 0.044 | 0.044 | 0.042 | 0.032 | 0.029 | 0.033 | 0.031 |
| Threefold layers | 0.035 | 0.038 | 0.034 | 0.036 | 0.033 | 0.036 | 0.034 | 0.034 |

As is seen from Table 1, when the duct has a square section the layer has no thickness at the corner parts of the duct in the case of the single layer and insufficient thickness also in the case of double and threefold layers. As the aluminium foil has a large thermal conductivity, such as situation as above mentioned should be avoided so far as possible. For this purpose it is recommendable to put a spacer between the duct and the heat insulating layer at the corner parts of the duct. However, if the duct has a round section there is no such a trouble as above mentioned.

What is claimed is:

1. A heat insulating layer comprising an aluminium foil and a thermo-contractile plastic film partly bonded with each other forming bonding points distributed uniformly over the surface of the film, wherein the aluminium foil is wrinkled, and plastic film is tightened by heating, so as to provide air spaces between the aluminium foil and the plastic film in the unbonded areas.

2. A heat insulating composite sheet consisting of an aluminium foil and a thermo-contractile plastic film partly bonded with each other forming bonding points distributed uniformly over the surface of the sheet.

3. A prefabricated panel comprising the composite sheet consisting of an aluminium foil and a thermo-contractile plastic film partly bonded with each other forming bonding points distributed uniformly over the surface of the sheet and a corrugated plate, to which the said composite sheet is loosely fixed to the peripheral parts thereof so that said sheet is in the same form as that of the corrugations of said plate whereby plural composite sheets can be transported as corrugated plates in close touch with each other, and the aluminium foil may be wrinkled and the plastic film may be tightened and air spaces may be formed between the composite sheet and the corrugated plate in the unbonded areas when heating the composite sheet.

References Cited

UNITED STATES PATENTS

| | | | |
|---|---|---|---|
| 2,016,429 | 10/1935 | Hayden | 117—41X |
| 2,990,027 | 6/1961 | Sabine | 161—148X |
| 3,089,283 | 5/1963 | Kirkpatrick | 52—309X |
| 3,247,927 | 4/1966 | Cragg | 161—129X |
| 3,281,257 | 10/1966 | Rosen | 117—10 |
| 3,414,181 | 12/1968 | Sloan | 161—123X |

ROBERT F. BURNETT, Primary Examiner

W. A. POWELL, Assistant Examiner

U.S. Cl. X.R.

52—309; 156—85, 91, 183, 184, 290; 161—129, 137, 147, 148; 264—342